Feb. 20, 1968   G. P. BAROZZI ETAL   3,369,744
DEVICE FOR PERFORMING DIRECT MULTIPLICATIONS OF FACTORS
SET ON AN ADDING MACHINE, BY THE HIGHEST
COMPENSATION, SHORT-CUTTING METHOD
Filed July 1, 1965   5 Sheets-Sheet 1

FIG. 1

Gian Piero Barozzi and
Giancarlo Horeschi,
Inventors
By Wenderoth, Lind & Ponack
Attorneys Feb. 20, 1968

G. P. BAROZZI ETAL  3,369,744

DEVICE FOR PERFORMING DIRECT MULTIPLICATIONS OF FACTORS
SET ON AN ADDING MACHINE, BY THE HIGHEST
COMPENSATION, SHORT-CUTTING METHOD

Filed July 1, 1965

Feb. 20, 1968  G. P. BAROZZI ETAL  3,369,744
DEVICE FOR PERFORMING DIRECT MULTIPLICATIONS OF FACTORS
SET ON AN ADDING MACHINE, BY THE HIGHEST
COMPENSATION, SHORT-CUTTING METHOD
Filed July 1, 1965  5 Sheets-Sheet 4

Feb. 20, 1968  G. P. BAROZZI ET AL  3,369,744
DEVICE FOR PERFORMING DIRECT MULTIPLICATIONS OF FACTORS
SET ON AN ADDING MACHINE, BY THE HIGHEST
COMPENSATION, SHORT-CUTTING METHOD
Filed July 1, 1965  5 Sheets-Sheet 5

United States Patent Office 3,369,744
Patented Feb. 20, 1968

3,369,744
DEVICE FOR PERFORMING DIRECT MULTIPLI-
CATIONS OF FACTORS SET ON AN ADDING
MACHINE, BY THE HIGHEST COMPENSATION,
SHORT-CUTTING METHOD
Gian Piero Barozzi and Giancarlo Horeschi, Tokyo,
Japan, assignors to Ricoh Company, Ltd., a corpora-
tion of Japan
Filed July 1, 1965, Ser. No. 468,818
Claims priority, application Italy, July 4, 1964,
14,633/64
8 Claims. (Cl. 235—60)

ABSTRACT OF THE DISCLOSURE

Apparatus for performing direct multiplication of fac-
tors set on an adding machine by a short-cut method in-
volving repeated additions and/or subtractions. A row of
gear registers is provided with stop means and a multiplier
slide having a feeler mounted thereon. Means are pro-
vided for shifting the multiplier slide along the registers
and each of the registers has a normal and reduced depth
portion according to the digit assigned thereto. The regis-
ters are provided with two zero positions. When the feeler
moves into one of the reduced depth portions of the
gear registers by a movement corresponding to a multi-
plicand set on the registers means are operated by the
feeler to cause the adding machine to perform a given
number of operative steps in a positive or negative di-
rection. Also, when one of the registers is in one of
the zero positions an extended portion on the feeler per-
mits the feeler to proceed through the tooth space cor-
responding to such zero position until it abuts a cover-
ing means on one of the gear registers set to a digit other
than zero thereby causing said multiplier slide to be shifted
to perform the multiplying operation.

This invention relates to a device adapted to be fitted
on the conventional adding machine for performing di-
rect multiplication, and more particularly to those hav-
ing a reduced keyboard, wherein the multiplication is
performed in the utmost short-cut manner by means of
a series of calculating mechanisms utilizing specially con-
figurated gears which can cause a number of forward
and backward turns as required to obtain the product of
the present numbers.

As already well known, if a multiplication is to be
performed on an adding machine, the multiplicand is first
set by pressing the setting keys; a number of operational
cycles equal to the lowest digit of the multiplier are then
made; adding zero after the lowest digit of the multi-
plicand, operational cycles equal to the tens figure of the
multiplier are then carried out; add another zero after
the lowest digit of the multiplicand and repeat the same
procedures until the machine shows the complete product
of the multiplication. Such method is called the process
of continuous addition.

The so-called direct multiplying method can be per-
formed only on adding machines that are fitted with a
multiplying device. In such a case, the operations are
performed by having the two factors entering into a
multiplication conveyed to the machine by setting them
directly on the keyboard, whereupon the required succes-
sive additions are automatically performed by the multi-
plying device of the machine. Such method is called:
automatic direct multiplication.

However, it is possible to reduce the number of suc-
cessive additions, as required for obtaining a given prod-
uct, by performing subtraction operations, along with the
addition operations. In this latter case, the method is
shortened, and essentially consists in the introduction of
negative factors, that are then compenstated by subse-
quent positive factors. As an example, when the multi-
plication 999×2 is to be performed by the above stated,
short-cut method, the adding machine will make, under
the control of the already known multiplying devices, the
addition and subtraction operations as follows:

$$-2+20-20+200-200+2000=1998$$

i.e. six complete calculation steps are performed.

The method proposed by this invention is based on
the principle according to which the positive and nega-
tive digits, having an equal absolute value, as utilized
in the short-cut method, are eliminated. In such a case,
the method is called: highest compensation short-cut
method.

By taking again the above example, the same multipli-
cation 999×2 will be performed by the machine through
the following operations: $-2+2000=1998$, i.e. two cal-
culation steps only are needed.

Many devices, by which the automatic multiplication
of two factors, previously set on the keyboard of adding
machine, by the highest compensation, short-cut method,
are already known. Such devices essentially consist of
scanning means for all of the racks or for a plurality
of racks that are designed to complete courses propor-
tional to the number of calculating steps to be made by
the machine in performing a given operation. Such num-
ber of steps may be made in the positive, or in the nega-
tive direction, and in such a case the number of calcu-
lating steps is reduced, and the added, or subtracted
digits, having an equal absolute value, are eliminated by
the scanning means.

However, many drawbacks are shown in such already
known devices. In fact, provision of the scanning means
is required for all racks with consequent material com-
plication and increase in the cost of the machine. More-
over, when one scanning means only is utilized for all
racks, the out-of-calculation cycles cannot be eliminated
if a zero is set on several of the racks. Secondly the high
cost and complication of the device for controlling the
single scanning means and the time taken by said single
means for scanning all of the racks result in added dis-
advantages.

These drawbacks are obviated by the device accord-
ing to this invention which allows elimination of out-of-
calculation steps when a zero is set on several racks.
Moreover, only one of the scanning means is required in
this device and material simplification of the multiplica-
tion device for adding machines is realized.

The device according to the invention essentially con-
sists of a specially designed gear group, associated with
a flange designed to cover the tooth spaces, and by which
the spaces of two consecutive teeth are left free. A num-
ber of such gears corresponding to each rack are pro-
vided, and each of the gears can mesh with the rack
teeth, as formed on these racks.

Each gear is formed with eleven teeth (i.e. with eleven
tooth spaces). Nine of such teeth and tooth spaces are
made to correspond to digits 1 to 9 inclusive, while the
remaining two teeth and tooth spaces are assigned to
zero. The two tooth spaces corresponding to two zeroes
are adjacent, and are left free by said flange, by which
the spaces of all other teeth are covered. The depth of
five teeth in each gear—which location will be exactly
specified later on—is reduced. These gears are loose fit
on a shaft located parallel to the axis of motion of a
pin-box by which the setting of a number is carried out.
This axis of motion can be drawn nearer to a row of
vertical racks and said gears are brought to mesh with
the teeth of the racks. Such motion occurs after the
multiplicand has been set, and while it is being printed,
and more precisely before that, the related rack is returned in its normal position. By said motion the multiplicand, as set on the keyboard, is conveyed to the gears corresponding to the racks by which the set figures have been printed. At the end of the multiplicand printing step, said gears are turned by as many teeth, as the number of the steps performed by the adding machine, as will be explained in more detail later on.

Now, after the multiplier has been set, and the machine is started by the equal (=) key, said gears are brought out of mesh from the racks and, following the usual printing of multiplicand by the part of the type-carrying levers, the setting slides (pin box) is disengaged from the conventional stops, and is connected with a further slide of the multiplier, which carries a tooth designed to pass through the free tooth spaces of gears when in one of the zero-positions, said tooth being thereafter stopped by said flanges secured to all of the gears placed in other positions than zeroes.

Consequently, the setting slide (hereafter called pin box) and the multiplier slide are allowed to move axially only when said multiplier slide tooth is not stopped by the gear flange. As previously stated, the same tooth will allow a motion of slides only when it is placed in a position coincident with one of the two zero tooth spaces.

Thus the set multiplier will be left set on the setting slide stops.

The sequence of operations carried out by the machine during the subsequent steps are as follows:

(a) The pin-box and multiplier slide are urged to move themselves axially, but are stopped by those gears which are turned from their positions so that the significant digits of the multiplicand are thereby obtained.

(b) The devices that form part of the adding section of the machine are started, whereby all addition and/or subtraction operations are performed in the already known manner, until all the above stated gears are returned in one of their zero positions.

As previously stated, according to the invention, the depth of five teeth of said gears is reduced. Thus, a suitable feeler, that is associated with said multiplier slide, and by which each gear is scanned, will be allowed to perform a given motion only if one of the five reduced depth teeth stands facing this feeler in the scanned gear, and such motion of the gears will be reversed in the subtraction operation. Associated with said multiplier slide is also a clearing means, that is always kept in correspondence with the gear that is being scanned by the feeler, and is facing to the non-reduced thickness portion of the teeth. When said feeler encounters said reduced depth portion of the toothings and is allowed to move, said clearing means is turned in a direction opposite to the usual clearing operation, whereby the related gear is turned in the same direction of setting numbers until the second zero thereof is brought in front of the stop teeth of the multiplier slide.

At the clearing operation, both slides are advanced until they are successively stopped by the gears turned from the zero positions, whereby all figures of the multiplicand are deleted.

In the meantime, it is prepared that the motion of the rack in the adding portion passes through the totalizer portion in a manner that the addition and subtraction can be simultaneously performed. At that time, the total sum printed on the paper is obtained through a cycle of operation known as "total cycle" in this adding machine. Thus at the end of multiplication operation, all of the gears shall be in a position corresponding to either one of the zero positions.

According to the invention, the number of steps to be performed by the machine for the multiplication depends on the value of the multiplicand. At this time, it is previously known that all of figures larger than 4 will cause an increase of one unit in the figure located at its left while they are conveyed to gearings of the multiplication mechanism. Also in the multiplication operation, said gears on which figures more than 4 are set are rotated in a direction adapted to provide complements for 10 of those figures. This is possible, according to the invention, by the provision of teeth having the two adjacent zero positions.

It follows that, in the case of figures larger than 4, a progressive decrease in the number of teeth to be cleared—and thus in the number of the calculation steps—is attained with the increasing value of the figures, since the required rotations of the gears are determined by the complement for 10 of a figure and not by the figure itself.

Turning back again to the already considered multiplication example (999×2), the multiplicand 999, set on the keyboard, will be changed to 1009 when they are conveyed to multiplication gears. That is, the 9 at the right remains unchanged because this is the first figure; the second 9 becomes 10 because this is increased by one i.e. to 0 after 9, repeating the same for the third 9 thus causing the fourth gear to be turned from zero (before 1) to 1. Thus, the multiplicand is conveyed to the gears as 1009.

By setting the multiplier 2 and subsequent conveying thereof to the machine, equal key (=) is set on the keyboard. The feeler will find the first gear at the right is set to 9, whereby the machine will perform a subtraction cycle, thus attaining the first zero after 9. Then, the stop tooth of multiplier slide is allowed to move to the left without encountering any obstacle because the subsequent figures are zero. However they are stopped encountering against the gear which is set on the digit one. At this moment, even the last numeral wheel is also cleared by an addition step, and the whole operation is performed by two steps only, i.e. the first gear is turned by a tooth in negative direction, while the last gear is turned by a tooth in the positive direction.

The above and other natures of the invention will be better understood from the following detailed description when read in conjunction with the accompanying drawings, wherein.

Referring now to the above figures, the description of the device according to the invention will be made by successive operative steps or cycles together with its adding mechanism.

According to the invention, the device for performing direct multiplications is associated with an adding machine of the already known reduced keyboard, listing type, having the device for the negative balance (or negative balance register). Only those components of said adding machine which are essential for a proper understanding of the multiplying device according to the invention, are shown in the drawing.

Figure 1:
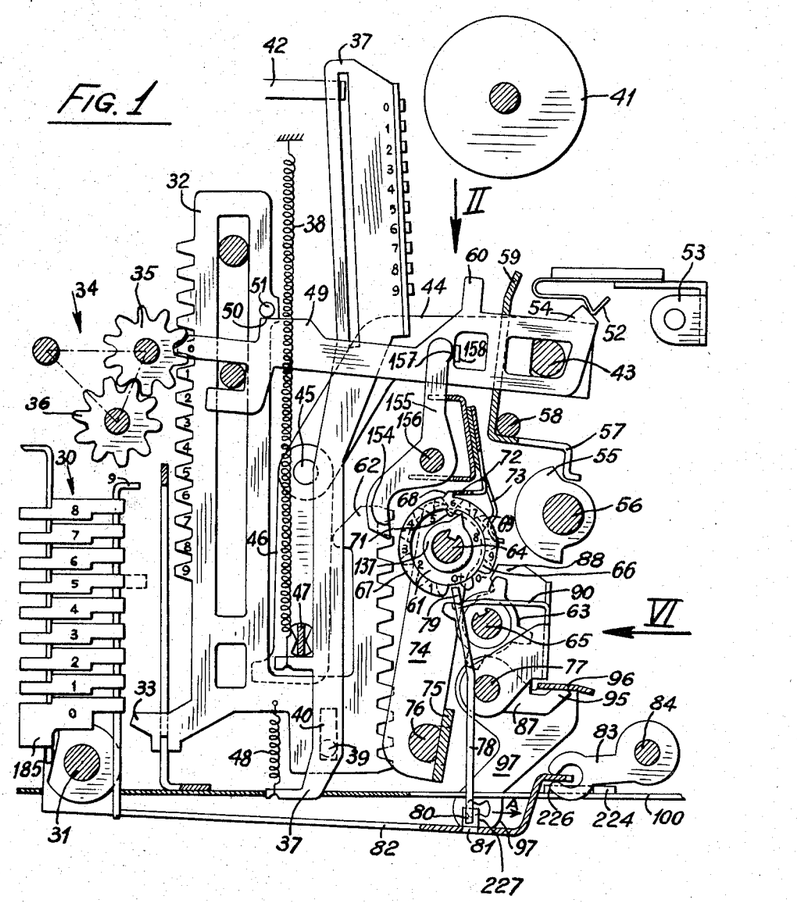
FIG. 1 is a longitudinal, side section, taken on the line I—I of FIG. 2, of an adding machine fitted with a multiplying device according to the invention.

Horizontal stops carried by a setting slide (or pin-box), generally indicated by the reference number 30 and slidably fitted on the crosswise directed axis 31, are actuated by the keyboard (not shown) of the adding machine. As indicated in FIG. 1, the horizontal stops are bearing numbers from 0 to 9, of which the number 9 is on the fixed stop of the same slide of the pin-box. When the pin is pushed outwardly by the key as exemplarily shown by a dotted line for the pin 5, a projection 33 of a vertical rack 32 engages and is stopped by the pin 5 while the vertical rack 32 is in the upward movement. Until that time, the vertical rack 32 moves a distance corresponding to five teeth of the same rack. The straight motion of the rack 32 results in a rotary motion of gears of totalizer designated in its entirety by the numeral 34. The totalizer gear 35 which is in mesh with the teeth of the rack 32 serves for the additional operation. The gear 36 indicated in disengagement from the toothing of the rack 32 is designed for performing subtraction operation. The upward motion of the rack 32 results in lifting of the type bar 37, which is urged upwardly by means of a spring 38, through a pin 39 slidable in an elongated hole 40 on the rack 32, and the length of said elongated hole is predetermined such that it is equal to the distance between the two successive pins on the pin box 30, that is, to one step.

When the type bar 37 is allowed to move upwardly by one step over the elongated slot 40, as will be explained in more detail later on, it will drag the rack 32 with it until the rack 32 is stopped by the pin 5, whereby the number corresponding to the pin 5 is brought in its ready-for-printing position in front of the rolled paper.

At this point, the type bar 37 is caused to strike the paper roller 41 by a member (not shown) at the end of a link 42, whereby the corresponding numeral is printed by the type.

Said lifting of type bar 37 is caused, in the course of the operating cycle of the machine, by the angular motion of shaft 43, secured to the lever 44, that is in turn connected by the pin 45, with the connecting rod 46, carrying the crossbar 47. It follows that, by the angular motion of shaft 43, the connecting rod 46 is lifted, which results in the crossbar 47 being also lifted by the swinging motion of lever 44, thereby disengaging all type bars 37. Interposed between the type bar 37 and the rack 32, there is provided a spring 48, and by this spring, said two members 37 and 32 are kept connected with each other in a manner that a pin 39 is urged into contact with the upper end of the elongated slot 40.

After the type is printed on the paper, the totalizer unit 34, which was previously disengaged from the toothing of the rack 32, before the lifting thereof, will be again brought into engagement, and during the downward motion of the rack 32 and type lever 37, under the control of shaft 43, through 44–45–46–47, the gear 35 is turned by a number of teeth equal to the figure as set on the pin box 30.

As already well known, when adding a further number to that previously set on the gear 35 so that the resultant sum exceeds 9, a decimal pawl 49 is pushed to the right by the gear 35 through a suitable cam (not shown), whereby the pin 51 of the rack 32 is disengaged from a step 50 of said decimal pawl 49 allowing the rack 32 to move downward under the action of the spring 48 by an amount corresponding to a step, and consequently causing the gear 35 to advance by a step.

A leaf spring 52 supported by a plate 53 is set against the reversed V-shaped project 54 of the decimal pawl 49 in order to define the two limiting positions (i.e. engaged and disengaged positions) thereof (see FIG. 1).

A cam 55 coupled with a main shaft 56 will make one complete revolution in the course of the operating cycle, thus preparing to bring the decimal pawl member 49 again in its engaged position by means of a lever 57 which is pivotally mounted on a pin 58 and other end 59 by which a projected portion 60 of said member 49 is acted upon when the latter member is in its disengaged position.

As already stated, the above-described mechanism is the already known section of an adding machine of the initially specified type.

Multiplying device

The multiplying device according to the invention, and with which an adding machine of the abovedescribed type is fitted, essentially consists of a row of gears 61—as shown in detail in the FIGS. 9–11–12—and is rotated by the rack 62, fast with the vertical rack 32, while their different functions are controlled by the gear 63, that is associated with feelers, which will be described later on.

The gears 61 are loose fitted on the shaft 64, and are in a number equal to that of related racks 62, while the gear 63 is torsionally connected with the shaft 65, being however axially slidable thereon, under the control of a tooth engaged with a spline. Each gear 61 is formed with eleven teeth 66, being the tooth spaces numbered as follows: nine spaces from 1 to 9, while the two remaining spaces correspond to two zero positions, of which the one is before the number 1, and the other is after the number 9. Such two zero positions will be respectively indicated, in an arbitrary manner, as 0+ and 0−.

The above-stated teeth 66, and the spaces therebetween, are covered, on the side directed to the right, in respect of the position of the machine operator, by a circular flange 67, except for the tooth spaces which correspond to stated positions 0+ and 0−. Said flange is formed with a tooth 68, which function will be explained later on, and that is designed to define a stopping of the flange 67 in a given position. The depth of the teeth 66 is reduced, on the side opposite to that of flange 67 by an undercutting 69 that extends only a given length thereof, such undercutting being made only on a convenient number of teeth —in the considered example: five teeth, and more precisely the teeth from the tooth space 3 to tooth space 8. A circular undercut 70, having a jutting-out tooth 71, is formed on the right side of gear 61. All gears 61, when in their rest position, are aligned with another, with the jutting-out tooth 68 resting against the stop 72, that is secured to the machine frame, each gear being retained in such a position by the plate spring 73, that is fitted between each pair of consecutive teeth.

The shaft 64, whereon said gears 61 are loosely mounted, is supported at both ends by two parallel levers 74 which are connected with each other by a crossbar 75 and secured to a shaft 76. The latter shaft is rotatably supported on the machine frame sides, and under the control of the main shaft 56, the gear 61 is enabled to engage or disengage the racks 62 as will be explained in more details. The gears 63 form a part of so-called multiplier slide assembly which includes a shaft 77 slidably supported by the sides of the machine frame. Fixedly mounted on said shaft is a member 78 (see FIGURES 1, 6, 8 and 9) having upward extension 79 which is designed to rest against the gear 61, when the gear 61 covered by the flange 67 is in front of said extension 79, and also designed to pass through the spaces 0+ and 0− of the same gears 61 when the extension 79 confronts with the spaces. A tooth 80 formed close to the lower end of said member 78 is designed to get engaged with one of the recesses 81 of a plate 82 which is secured crosswise to the pin-box 30, and this plate member 82 can be swayed around the axis 31 under control of the lever 83 fixed on the shaft 84. The movement of the shaft 84 is caused by the devices which will be described later on.

The slide-multiplier assembly is moved from the right to the left, in respect of the machine operator, by a spring 85, that extends between a stationary component of the machine frame, and the extension 86 of member 78.

A second member, i.e., the so-called feeler 87, is associated with the first member 78, and can freely rotate round the shaft 77. Such feeler is formed with an extension 88 (see FIGS. 1–8–9), which is in front of first gear 61, when in its rest position, and is biased against the undercutting 69 by the spring 89. The member 87 is also formed with an extension 90, parallel to, and spaced from the extension 88, the gear 63 being longitudinally retained therebetween. The gear 63 can therefore be caused to slide, along with the multiplier slide, on the axis 65, and can be rotated by such axis through known means.

The spring 89, by which the extension 88 is kept in contact with the tooth crest 69, is also designed to have the feeler 87 axially biased, thereby urging the same into continuous contact with the member 78 allowing however both components to be axially drawn away from each other, when any obstacle is encountered by the extension 88—as e.g. the stop teeth 68, or a possible asperity of gears—while the whole multiplier slide is being moved. Such axial separation of said two components will result, by the action of inclined plane 91, in an outwardly directed rotation of member 87, with consequent withdrawal of feeler 88, and overcoming of the obstacle.

At any rate, the whole multiplier slide unit, as fitted on the axis 77, can be axially moved under the action of spring 85, when the tooth 92, that is detained by the spring 93, is lifted above the fixed catch 94, that is secured to bed 100. The member 87 is also formed with a further extension 95, that normally rests on a bridge 96, which is revolvingly fitted on the machine frame sides 101–102 (see FIGS. 1 to 7). The bridge 96 is formed with an extension 97 at its left end, and carries a pin 98 at its right end. It follows that, when the extension 95 is turned, the bridge 96 is lifted, thereby causing the extension 97 and also the pin 98 to be turned round the axis 77.

*Entering of the multiplicand*

To perform a multiplication on a multiplicand by the multiplier, the multiplicand is first set, by the keys, on the horizontal stops of the pin-box 30. Such stops will project outwardly, as shown by dash lines, in FIG. 1 and following the depression of key "×" 99 (see FIGS. 5 and 2), the rod 104 is moved, by the action of inclined plane 103, that is formed on the lever of said key, in the direction of the arrow B. The rod 104 turns a rocker arm 105, which causes a member 107 having an extension 108, whereon a roller 109 is mounted, to be moved axially across the shaft 106, until said roller is brought into contact with the cam 110 solid with the main shaft 56.

Along with the depression of the key 99, a lever 112 which is pivoted around an axis 113 through the action of a pin 111 is also descended. The lever 112 has an end porion 114 causing to move a pin 115, formed integral with a rocker lever 116. This rocker lever 116 is pivotally mounted on a shaft 117 and its end 118 is stepped-down in such a manner as to have steps corresponding to sign "×" formed in front of a tab 119 which is integral with the sign rack 120. Said rocker lever 116 is kept by the spring 121 in its rest position.

The rack 120 is connected by means of the extension 122 and a pin 123 with the type bar 124 and is urged upwardly by a spring (not shown), whereby when the ×-key is depressed, the related type "×" is brought in front of the paper supporting roller, and the sign "×" is printed on the paper. The key 99 and the lever 112 are respectively brought back in their rest position by the springs 125 and 126.

Simultaneously with the depression of the key 99, an electric motor of the machine is started at the end of downward stroke of the key 99, and the main shaft 56 completes a whole revolution for the operating cycle.

Consequently, the roller 109 is lifted by a cam 110, thus causing the lever 107 to be swung around an axis 106. The lever 107 thereby imparts a swinging motion to an arm 129, through a fork 127 and a pin 128, and said arm 129 will in turn lift a rack 131 by means of a pin 130. The rack 131 is guided by a pin 132 engaged in an elongated slot 133 and by a roller 134 provided on a guide 135 (see FIG. 5).

The upward motion of rack 131 results in a turning of gear 136, fast with the shaft 64. (See FIGS. 1 and 5.) Torsionally connected with said gear are the washers 137, having one tooth, and is thereby engaged with the tooth 71 or gear 61 (see FIGS. 1, 11, 12). By said turning motion of shaft 64 and of washers 137, the whole row of gears 61 is brought, along with the stop 68, against the fixed rest 72, i.e. all gears 61 are brought in the 0+ position, in front of the extension 79. Simultaneously, a rotation of cam 110 causes, with the aid of pin 138, a downward motion of the extension 139 of lever 140, that is pivoted at 141, and has a suitably slotted lower end 142. Guided in said slot is a pin 143 fixed to the lever 144, that is secured to shaft 76, so as to cause the parallel levers 74 to be swung to the right, with consequent disengagement of gears 61 from the racks 62. The disposition of pin 138, and the profile of cam 110 are such that, when said cam 110 starts to rotate, the swinging of levers 140–144–74 and the disengagement of gears 61 first occur, whereupon the roller 109 is lifted, with consequent upward motion of rack 131, as previously described. Said motions correspond to about half a revolution of cam 110, that is keyed to main shaft 56.

Now, the already known printing means, ending with the above-stated rod 42, are operated, and the type lever 124 strikes against the paper for printing the multiplicand and the sign "×" thereon. Then the pin 138 is brought, by the further rotary motion of cam 110, in front of the inclined plane 145, as formed on the tappet 146, pivotally fitted on the axis 147, and that was previously swung downwardly, due to disengagement of the pin 150, fixed to the same tappet, from the extension 149 of arm 129.

Thus, the inclined plane 145 is caused to interfere with the path of pin 138, and is thereby moved, by this latter, toward the axis 147, of the lever 140. This lever, due to the action thus exerted on its upper end, is swung round the axis 141 in a direction opposite to that in which it was swung by the action of pin 138 against the extension 139, at the start of the rotation of cam 110.

Figure 5:
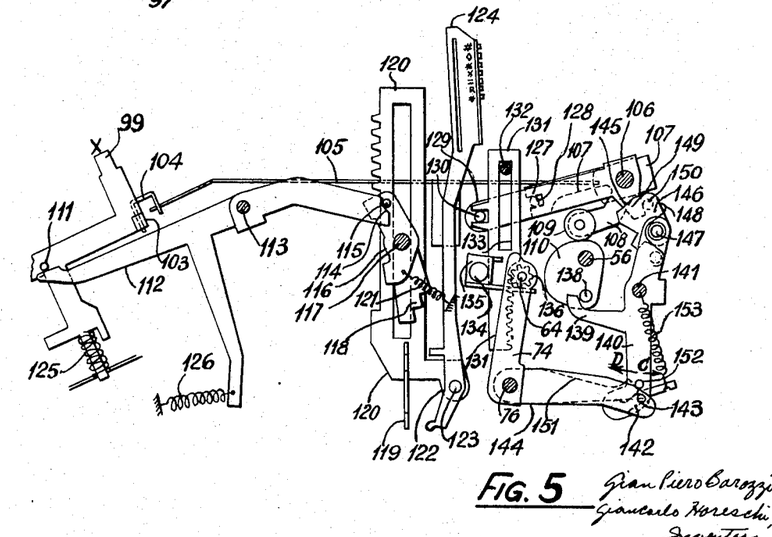
FIG. 5 is a side view, taken on the line V—V of FIG. 2, of the mechanism that is associated with the ×-key, and of the mechanism that is associated with the sign-selector.
Figure 6:
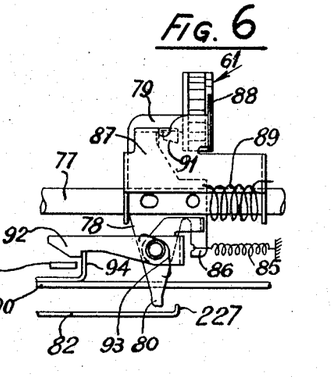
FIG. 6 is a view of the multiplier slide, taken on the line VI of FIG. 1.

This motion of lever 140 is restricted by a further lever 151, shown with dashed lines in FIG. 5, that is pivotally fitted as at 76, and by which the pin 152, on the lever 140, is acted upon under the action of spring 153.

The motion performed by the lever 140 when the cam 110 starts to rotate, and the next, oppositely directed motion thereof, are respectively indicated by the arrows C and D. As previously stated, by such motions, the gears 61 are respectively disengaged from, and engaged with the racks 62 of racks 32.

At this point—that corresponds to slightly more than half a revolution of the main shaft 56 of the machine, all racks 32, which were moved upwardly, are again brought downwardly, to their start position, under the action of the crossbar 47, whereby the gears 61 are turned, by the racks 62, as engaged therewith, through a number of tooth spaces corresponding to figures of the set numbers.

Thus, the multiplicand set on the keyboard is transferred to the gears 61.

The above refers to numbers consisting of figures smaller than 5. In the case of numbers with figures greater than 4, the first tooth after the undercut section 69 of gear 61, is brought in front of the end 154 of the rocking lever 155, pivoted at 156. The opposite end 157 of the same lever is in contact with the tab 158 of the tens transmission member 49 which, as already stated in the description of the adding mechanism of the machine, will disengage, by means of the step 50, the pin 51 of the rack 32 that is located at the left of said member 49, whereby the rack 32 is lowered by one step more, and consequently the adjacent left hand gear is turned by one tooth more. In other words, the left hand gear 61 will be turned by one unit in excess.

In the meantime, the main shaft 56, along with the cam 110, will complete its whole revolution whereby, due to the profile of the cam, and the action of return spring 159 (see FIG. 2), the rack 131, along with all the members that are connected therewith, are again brought back to their start positions. Also all the other members which were moved due to the depression of the key 99, are brought back to their initial positions, under the action of the return springs. Now, the multiplicand is transferred to the gears 61, with the related increases of one unit on the gears that are at the left of figures higher than 4.

Entering the multiplier

The multiplier number is set on the same keyboard, whereafter the =-key (see FIG. 3) is depressed. Such depression of said key results in a swinging of lever 161 round the axis 113, with consequent lifting of lever 162, and of pin 163, fixed to lever end 162.

The lever end 162 is connected, by the connecting rod 164, with the rod 165, carrying the pin 166, and the rod 165 is connected with the bell-crank lever 167 pivotally fitted on the shaft 76.

The end 168 of a second lever, pivotally mounted on axis 113 is simultaneously lifted by the pin 163. Fixed on said lever end is a tab, that is engaged under the projection 169 of a plate 170, by which the plate is lifted and guided in perforations 171 of the machine frame, and kept under the action of a return spring 172.

The upward motion of the plate 170 results in a lifting of the tabs 173–174, that are secured thereto, that the tab 173 is brought in front of the end 175 of a lever 176 pivotally mounted at 76, while the tab 174 is brought in front of a pin 166 carried by the rod 165.

By the depression of key 160, the electric motor is started, whereby the operating cycle is also started by the rotation of shaft 56, whereon the cam 117 is keyed.

The cam 177 is shaped and arranged in such a manner as to have the end 178 of lever 176 acted upon by it during the last portion only of the revolution of main shaft 56. In the meantime, the figures of the multiplier are printed, along with the related sign "=" on the paper, by the components of the adding mechanism of the machine in a manner similar to that described above, whereupon they are returned to their rest position.

At this point, the cam 177 has been turned in the direction of the arrow L, and the end 178 is again acted upon by it, whereby the lever 176 is swung in the direction of the arrow F, thus bringing the opposite end 175 thereof, in front of the tab 173, and enabling it to move the plate 170 to the left, until the projection 169 is disengaged from the tab carried by the lever end 168.

Figure 2:
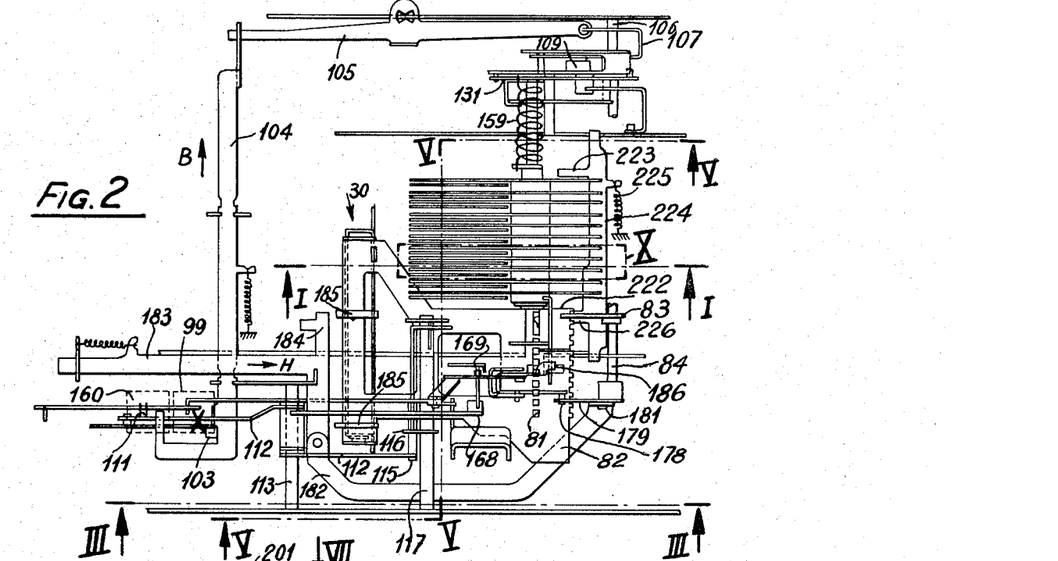
FIG. 2 is a plan view of a few components of the device of FIG. 1.

Simultaneously, the rod 165 has been moved in the direction of arrow E, by the tab 174 the plate 170 (see FIG. 3) that was already brought in front of pin 166, whereby the bell-crank lever 167 is swung round the shaft 76, thus causing the pin 178, fixed on the opposite end of said lever 167, and engaged with the fork of lever 179 secured to shaft 84, to rotate the lever 179 in the direction of arrow G. Pivotally connected with the end 181 of the lever 179 is the rod 182, that is in turn connected with the horizontal rack 183, which is thereby moved in the direction or arrow H. The sliding stops 185 (of which two only are shown in FIG. 2, to prevent the drawing from becoming too crowded), correspond to zero figures of the not-utilized columns, are urged outwardly by the face 184 of said rack 183 (see FIG. 2).

At the same time, the tooth 92 is lifted by the tab 186 of the lever 167 (see FIGS. 2–3 and 6), thereby disengaging it from the fixed stop 94. As a consequence thereof, the whole multiplication slide moves under the action of spring 85, thus bringing the extension 79 into contact with the flange 67 of the first gear, wherever a figure different from zero is set (see FIGS. 1–6–9–11–12).

Simultaneously, the swinging motion of lever 179, causes the shaft 84, to which it is secured, to be turned in the direction of arrow G, whereby all levers secured thereto are swung in the same direction. Among such levers there is the lever 83 (see FIG. 1) having a pliers shaped end, by which the plate 82 is lifted, thereby bringing one of the holes 81 into engagement with the tooth 80 of member 78, that forms part, as already stated, of the multiplier slide, thus firmly connecting the latter slide with the setting slide 30. The lever 179 (see FIGS. 3 and 4) while being swung in the direction of arrow G, causes a shifting of rod 187, thereby disengaging the tooth 188, secured to slider 189, that is biased upwardly by the spring 190. However, said slider 189 cannot be lifted, since it is held back by the cross bar 47, whereon the extension 191 of slider 189 rests.

Fixed to the shaft 84 is also the lever 192 (see FIG. 4) which when said shaft is turned, is also swung in the direction of arrow G, thus disengaging by its end, the bridge 96, whereby the extension 95 of feeler 87 (see FIG. 1) is allowed to go upwards. The feeler 87 which, as already stated, carries the extension 88, can be subsequently turned only when the undercut portion 69 of gears 61 is encountered by said extension 88.

Thus, the first rotation cycle of main shaft 56 of the machine is now completed. Such step is inclusive of all printing operations of mulitplier, as well as of pre-setting for the multiplying operation, being the last pre-setting step represented by the disengagement of the extension 88 of feeler 87, thus allowing the same extension to enter, or not, into the tooth spaces 69.

How the multiplication operation is performed

At the end of said first whole revolution of main shaft 56 of the machine, the shaft will continue to turn, thus starting a second cycle that corresponds to the first operation of addition, or of subtraction allowed by the first gear 61 at the right, containing a significant number.

Said second cycle comprises the following operations:

The totalizer unit 34, which at the start of said cycle is disengaged from the teeth of rack 32, is left in its rest position, or is turned. It is left in its normal position, when a not undercut crest of one of the teeth of gear 61 is encountered by the extension 88 of feeler 87, and is conversely turned when an undercut tooth of gear 61 is encountered by said extension 88, which is thus allowed to advance until contacting the undercut surface.

Figures 3, 8:
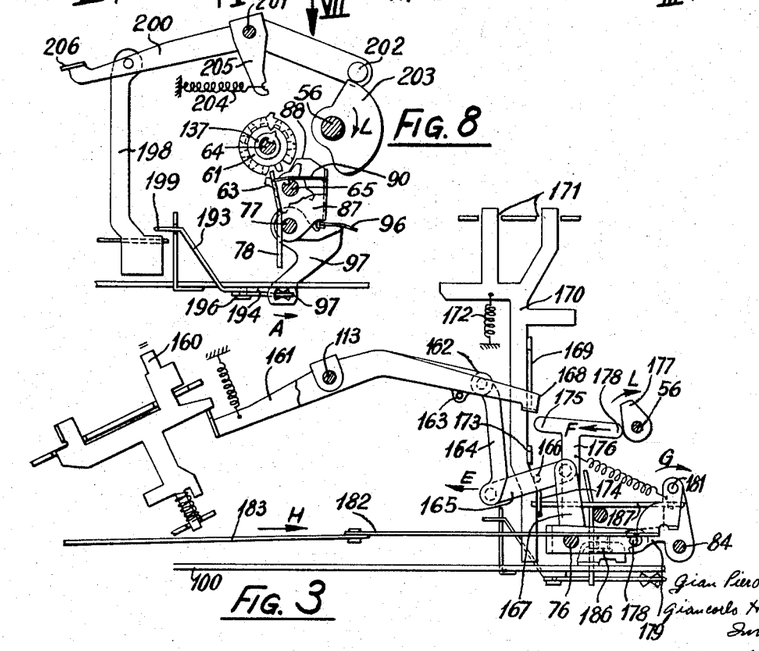
FIG. 3 is a side view, taken on the line III of FIG. 2, of the mechanism only which is connected with the =key.
FIG. 8 is a cross-sectional side view, taken on the line VIII—VIII of FIG. 7.
Figure 4:
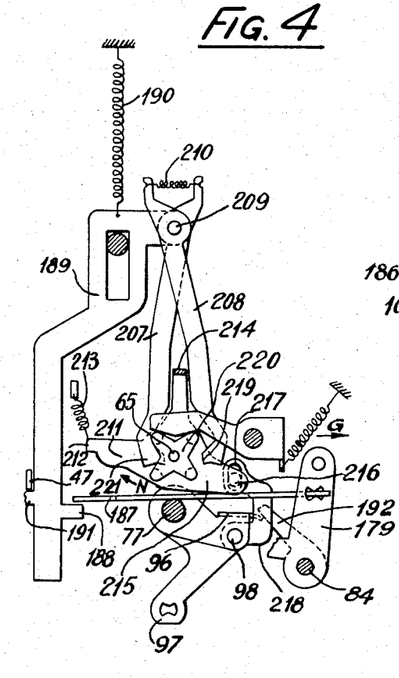
FIG. 4 is a side view of the right section of the mechanism that is connected with the feeler.
Figure 7:
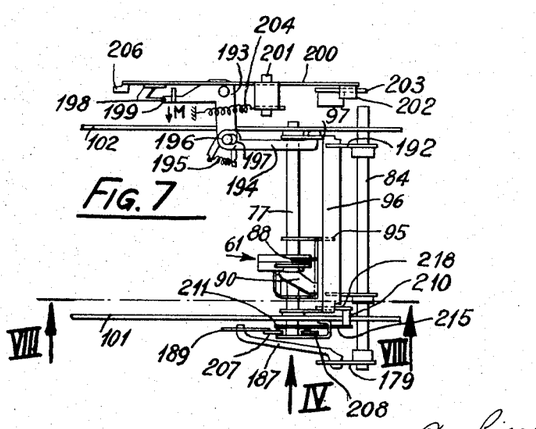
FIG. 7 is a plan view of the mechanism that is connected with the feeler, also shown in FIGS. 4 and 8.
Figure 9:
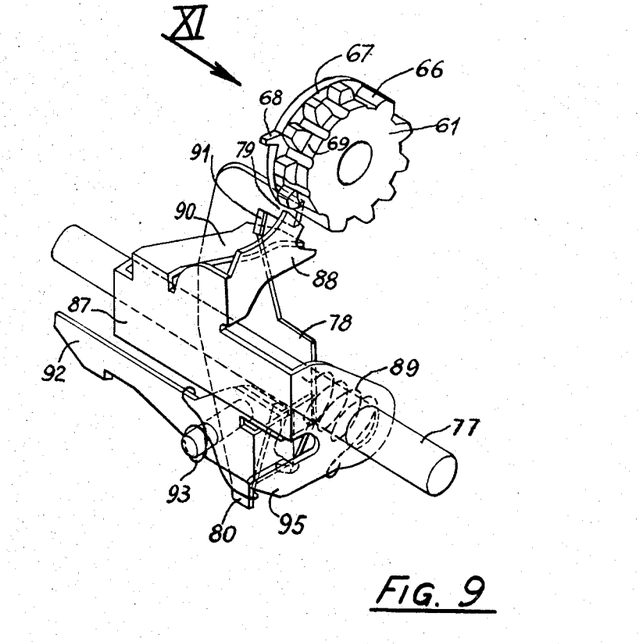
FIG. 9 is a perspective view of the multiplier slide, as shown in FIG. 6.
Figure 10:
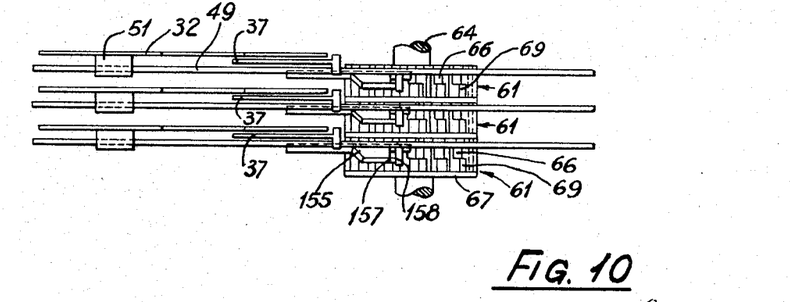
FIG. 10 is a plan view of a detail of FIG. 1, and indicated at X, and by a dot-and-dash line in the FIG. 2.

The actions that are performed in both cases will be now described with reference to FIGS. 7 and 8. When the extension 88 is confronted with a not undercut tooth of gear 61, it cannot be moved forward. Consequently, the extension 97 of bridge 96 will remain stationary, thus leaving in position the bell crank lever 193, that is resiliently connected therewith through the rod 194. Said resilient connection between the above-stated two components is established by the spring 195, hooked to related extensions of bell crank lever 193 and of rod 194, whereby the pin 196, fixed to the bell crank lever 193, is kept against the bottom of slot 197, on the rod 194.

The spring 195 and slot 197 are provided to compensate for the overtravel of member 192 on the bridge 96.

The upward stroke of rod 198 is stopped by the extension 199 of lever 193, which is held in its initial position. Said rod 198 is urged upwardly by the lever 200, pivoted at 201, and carrying a roller 202, fitted on the end of lever 200 opposite to that at which it is connected with the rod 198. The roller 202 cooperates with the cam 203, that is keyed on the main shaft 56 of the machine, turning in the direction of arrow L. The shape of said cam 203 is such as to allow the lever 200 to swing under the action of the spring 204, respectively connected with a fixed point of the machine, and with the extension 205 fixed to lever 200. The rod 198 is thus urged upwardly by the spring 204 and can be moved only if allowed by the tooth 199. The end 206 of lever 200 controls the operation of totalizer 34 by known means and, when left in its initial position, allows the totalizer to remain in its normal position.

When the extension 88 is in front of one of the five undercut teeth of gear 61, it can be moved forward by spring 89 (see FIGS. 6 and 9), thus shifting the extension 97 of bridge 96 while through the rod 194, the slot 197 and the pin 196, the end 199 of bell crank lever 193 is swung in the direction of arrow M, (FIG. 7) thereby allowing the rod 198 to move upwardly, under the action of spring 204. Consequently, the end 206 of lever 200 is also lifted, thereby operating the totalizer unit 34, i.e. bringing the lower gear in front of the teeth of rack 32.

The main shaft 56, pursuing its rotary motion, allows the cross-bar 47 (FIGS. 1–4) to be lifted, with consequent upward motion of racks 32, that are connected with the type levers 37—the whole in the well known manner, and as already explained in the preceding general description.

After the racks 32 and 37 have been stopped against the set stops of the pin box 30, the totalizer unit 34 is urged against the rack 32, whereafter either gears 35–36, respectively corresponding to the addition and to the subtraction, will be brought in mesh, according to the position taken by the extension 88 of feeler 87, as specified above.

In the subsequent downward motion of cross-bar 47, the figures are conveyed, by the already lifted racks 32, to one of the two rows of gears 35–36, with which each rack 32 was in mesh.

Simultaneously, the slider 189 is allowed to move upwardly, under the action of spring 190 (see FIG. 4), by the lifting of cross-bar 47. Such motion is transmitted to the two claws 207–208, that are pivotally connected with the upper end of said slider 189 by the pin 209, and are urged toward one another by the spring 210, secured to the upper ends of said claws 207–208. These claws are associated with the rocker lever 211, pivotally fitted on the axis 65, and carrying an extension 212, that is connected with the machine frame by the spring 213, that tends to rotate said rocker lever 211 in the direction of the arrow N. The rocker lever 211 is formed with an extension 214, that is interposed between the claws 207–208, and with a further extension 215, having a pin 216, engaged in the slot 217 of connecting rod 218, pivotally mounted on a pin 98 fixed to the bridge 96 (see FIGS. 4 and 7). The extensions 214–215 of the rocker lever 211, are swung therewith in the direction of arrow N, under the action of spring 213. The motion of said bridge 96, that is caused by the extension 88 of feeler 87, when the extension is in front of one of the undercut teeth of gear 61, will result in a motion, in a direction opposite to that of arrow N, of the rocker lever 211 under the action of connecting rod 218. Consequently, the extension 214 of said rocker arm 211, interposed between the claws 207–208, will shift both said claws to the left, i.e. in a direction opposite to that of arrow N, until the lower end 219 of claw 208 is brought close to one of the four teeth of star wheel 220 that is keyed on said shaft 65.

When the assembly formed by the slider 189, and by the claws 207–208 that are connected therewith by the pin 209, is shifted downwardly under the action of crossbar 47, said star wheel 200—and consequently also the shaft 65—is turned by one quarter of a revolution by the lower end 219 of claw 208, while said crossbar 47 is brought back to its starting position.

The above described motions, as performed up to the bringing of the lower end 219 close to the teeth of star wheel 220, are allowed—as stated before—when the extension 88 of feeler 87 can be moved forward, i.e. when it is in front of one undercut tooth. In such a case, when the slider 189 is brought back to its starting position, the star wheel 220 is turned in the direction of arrow N. Conversely, when the extension 88 of the feeler is in front of one not undercut tooth 66 of gear 61, no motion is performed by the bridge 96 and by the rocker lever 211, whereby the claws 207–208 are retained in their position by the rocker lever extension 214, and the lower end 221 of claw 207 is kept near the teeth of star wheel 220.

It follows that, due to the downward motion of slider 189, the star wheel 220 will be turned by a quarter of a revolution in a direction opposite to that of arrow N.

Said motion can be described, in short, as follows: when the end 88 of the feeler is in front of one not undercut tooth 66, the star wheel 220 is turned by a quarter of a revolution in anticlockwise direction (opposite to that of arrow N), at the end of each operational step; conversely, when the feeler end 88 is brought in front of one of the undercut teeth 69, being thus allowed to move forward, the star wheel 220 is turned by a quarter of a revolution in a clockwise direction.

Along with the star wheel 220 is turned also the shaft 65, whereon it is keyed; consequently, the gear 63, that is also connected with said shaft 65 (see FIGS. 1 and 8) will be also turned. Such gear 63, that is constantly kept near the not undercut teeth of gear 61, which is being scanned by the feeler extension 88, will turn said gear 61 in the one, or in the opposite direction, by an angular amplitude equal to that of one tooth of said gear. Thus, the gear 61, that is being scanned by the feeler extension 88, is turned by one tooth in one direction, or in the opposite direction, i.e. toward the position 0+ or 0−, after the end of each operative cycle.

It follows that the machine will perform, for each scanned gear, as many addition or subtraction operations, as required for having said scanned gear turned in the positive or negative direction, until attaining, with their 0+ or 0−, a position in front of the extension 79 of member 78 (see FIGS. 1–11–12).

Figures 11, 12:
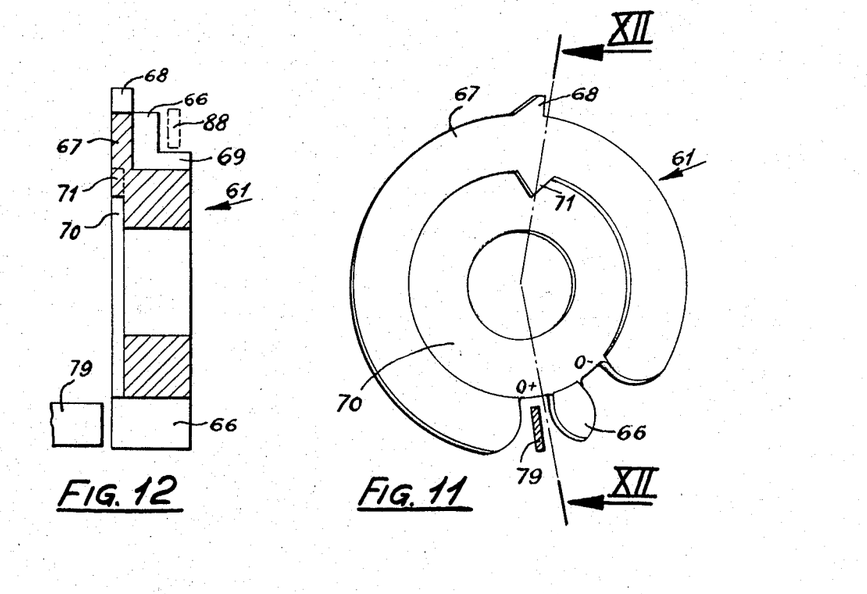
FIGS. 11 and 12 respectively are a side view of the gearing of FIG. 9, taken in the direction XI, and a section taken on the line XII—XII of FIG. 11.

When the scanned gear 61 is thus brought to one of its zero positions, said extension 79 is allowed to pass through the space that is left free in the same gear, until resting against the flange 67 of the next gear (on the left side), which is in a position different from that of their zeroes (see FIGS. 11–12).

Such motion of extension 79 (and consequent motion of feeler 78), allows the pin box 30 to be shifted, since said feeler 78 is connected with the pin box through the extension 80, that is engaged in one of recesses 81 of plate 82, which is secured to same pin box 30 (see FIG. 1). At the end of such motion, the pin box 30 is shifted by one, or more columns, i.e., by as many columns, as the gears 61 are having zero positions aligned with the extension 79, thus allowing the same to pass therethrough.

When the flange 67 of anyone of gears 61 is in a position different from their zero positions, which is encountered by said extension 79, the machine will repeat said cycle, thus bringing to either zero positions such gear, until all previously turned gears are zeroised. At the end of such zeroising operation, the pin box 30 is allowed to continue its travel to the left, until the left end 222 of plate 82 strikes against the extension 223 of slider 224, that is constantly kept to the right by the spring 225 (see FIGS. 1 and 2). Such motion results in a release of lever 83, that rests on the extension 226 of slider 224, thus allowing lever 83 to be swung downwardly, whereby the tooth end 80 is disengaged from the recess 81, with consequent discontinuation of the connection between the pin box 30, and the multiplier slide, through the members 78–87 and 63, and the extension 88, as shown in FIG. 9.

At this point, the pin box 30 is brought back to its initial position to the right, pulling along with it, by means of the extension 227 of plate 82 (see FIGS. 1 and 6) the above defined multiplier slide, until the tooth 92 is engaged with the fixed stop 94, thus the whole assembly is brought back in its zero position. The machine is stopped, and the product obtained, as stated before, through a sequence of additions and of subtractions, as shown on the totalizer 34, and can be printed on the paper strip supported by the roller 41, by depressing the total key, in the manner already known for the adding mechanism of the machine.

For a more complete disclosure of the operation of the different means according to the invention, we will consider again the numerical example of the multiplication (999×2), already discussed in the preceding description. After having set the multiplicand 999 on the keyboard, the multiplication key (×) is depressed, said number is then printed on the paper band by the type levers 37, by the motions already described in the preceding section "Entering the multiplicand," whereupon it is transferred to the gears 61 of the multiplier. In the course of such transfer, the first gear 61 at the right is turned by the related rack 32 by an amount corresponding to nine steps. However the figure 9 being greater than four, a tens transmission is made to the directly adjacent gear 61 at the left, because when said first gear at the right is turned farther than for the first four steps, the tooth 66 thereof, following the tooth space No. 8 (see FIG. 1), causes—as an effect of its entering into contact with the lower end 154 of rocker lever 155, and by the action of components that cooperate therewith—a downward motion, through one step, of the next rack 32 at the left, with consequent turning through one step of gear 61 that is connected therewith. Since this gear has already been turned through nine teeth in the course of said transfer, for the setting of the second 9 of the multiplicand, it will be turned, as already stated, by a further step, thus attaining its 0— position.

The same occurs simultaneously for the third figure 9, and thus for the third gear 61, which is also brought to its 0— position. The gear 61, following that of the third figure 9 of multiplicand, and whereon no figure is set, will be also simultaneously turned by one step, thus taking its 1-position. The multiplicand is thus entered in the gears 61 by the figures 1, 0—, 0—, 9. Now, by entering the multiplier 2, and by depressing the =-key, after the figure 2 and the sign = have been printed, the adding mechanism of the machine will perform, first of all, a subtraction operation of figure 2. Such subtraction operation is performed by the first gear 61 at the right, whereon the figure 9 is set, since the zeroising thereof occurs by bringing such gear to its 0-position, i.e., to complement to 10. The extension 79 is thus disengaged from the flange 67, whereupon both the multiplier slide unit, and the setting slide are shifted to the left, until bringing the extension 79 into contact with the flange 67 of the gear whereon the figure 1 is set. Now, an addition operation as determined by the figure 1 of said gear is performed by the machine, i.e., the number +2000 is added to the figure −2, wherein said "2000" is determined by shifting said slide and the pin-box by three steps.

Since no figure is set on the gears 61, the following gears are in their zero position, whereby the whole mechanism is brought back to its rest position and is ready for printing the total 1998 on the paper roll or for processing it in a next operation.

Thus, according to the invention, the above-described operation is performed by two operative steps only, with consequent saving of time in respect of the calculating machines of the already known types.

While a certain, specific form of the invention has been herein shown and described, it is to be understood that various, obvious changes may be made therein, without departing from the true spirit of the invention, as defined in the appended claims.

What we claim is:

1. A device for performing direct multiplication of factors set on an adding machine by the highest compensation and short-cut method obtained by repeated additions and/or subtractions comprising a row of gear registers, stop means associated with said registers, a multiplier slide, a feeler mounted thereon, means for shifting said multiplier slide along said registers, each of said gear registers having a normal and a reduced depth portion according to the digit assigned thereto, said gear registers having a zero position before the digit "1" and a zero position after the digit "9," means covering all of the tooth spaces corresponding to the digits "1" through "9" of each gear register so that those corresponding to said zero positions are left open, means operated by said feeler when moved into one of said reduced depth portions of said gear registers by a number corresponding to a multiplicand set on said gear registers to cause said adding machine to perform a given number of operative steps in a positive or negative direction, and means including an extended portion on said feeler when one of said registers is in one of said zero positions allowing said feeler to proceed through the tooth space corresponding to said zero position until it abuts said covering means of one of said gear registers set to a digit other than zero, whereby said multiplier slide is shifted to perform the multiplying operation.

2. A device according to claim 1 wherein a tens transfer mechanism cooperating with said gear registers having a decimal pawl member is provided so that when a digit is set on one of said gear registers higher than a given value the gear register next at the left of said gear register is moved one step by said decimal pawl member of said tens transfer mechanism.

3. A device according to claim 1 wherein said feeler has a movement parallel to said gear registers to scan the outer surface of said gear registers successively without losing contact therewith, so that said feeler may move into a reduced depth portion when encountered.

4. A device according to claim 1 wherein an inclined plane is provided to cooperate with said feeler, means operated by said inclined plane to temporarily lift said feeler from said gear register when the travel of said feeler is hindered, and resilient means cooperating with said inclined plane to keep said feeler in contact with said gear registers.

5. A device according to claim 4 wherein said means operated by said inclined plane are operated when said multiplier slide is being shifted and stops said feeler.

6. A device according to claim 1 wherein said multiplier slide has an extension and a pin-box connected therewith so that a shifting of said slide takes place when said extension passes through the tooth spaces of a register gear.

7. A device according to claim 1 wherein a reversing device is operated by said feeler, for bringing a gear register to zero when said feeler enters a reduced depth portion of said register gears.

8. A device according to claim 7 wherein said feeler controls said reversing device for the gears of a product register forming part of the adding mechanism of the machine, said device being left in the adding position when a normal tooth is encountered by said feeler, while when a reduced tooth is encountered by said feeler, said reversing device is brought into its subtraction position.

References Cited

UNITED STATES PATENTS

| | | | |
|---|---|---|---|
| 2,379,877 | 7/1945 | Britten | 235—79 |
| 2,399,170 | 4/1946 | Chase | 235—60 |
| 2,886,238 | 5/1959 | Plunkett | 235—63 |
| 3,005,585 | 10/1961 | Capellaro et al. | 235—63 |
| 3,037,691 | 6/1962 | Kuhn | 235—60 |
| 3,268,165 | 8/1966 | Gelling | 235—60 |

STEPHEN J. TOMSKY, *Primary Examiner.*